Sept. 19, 1972 D. P. MARINELLI 3,692,592
METHOD AND APPARATUS FOR DEPOSITING EPITAXIAL SEMICONDUCTIVE LAYERS FROM THE LIQUID PHASE
Filed Feb. 12, 1970
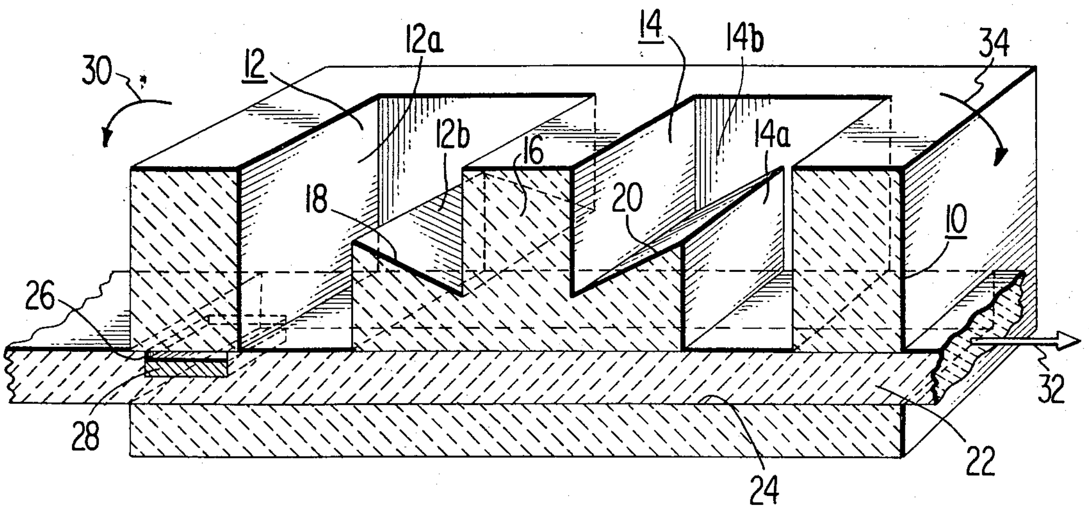
INVENTOR.
Donald P. Marinelli
BY [signature]
ATTORNEY United States Patent Office 3,692,592

Patented Sept. 19, 1972

3,692,592

METHOD AND APPARATUS FOR DEPOSITING EPITAXIAL SEMICONDUCTIVE LAYERS FROM THE LIQUID PHASE

Donald Paul Marinelli, Trenton, N.J., assignor to RCA Corporation

Filed Feb. 12, 1970, Ser. No. 10,883
Int. Cl. H01l 7/38
U.S. Cl. 148—172 10 Claims

ABSTRACT OF THE DISCLOSURE

One or more epitaxial layers of a semiconductive material are deposited on a substrate in a furnace boat containing for each layer to be deposited a reservoir well adjacent to but vertically above a growing well. A charge of the ingredients of each of the epitaxial layers is placed in a separate one of the reservoir wells and the boat is heated to melt the charges. The melted charges are successively poured from their respective reservoir wells into their adjacent growing wells and the substrate is placed into the respective growing wells to permit an epitaxial layer to deposit on the substrate.

BACKGROUND OF INVENTION

The invention herein disclosed was made in the course of or under a contract or subcontract thereunder with the Department of the Army.

The present invention relates to the deposition of epitaxial semiconductive layers, and more particularly to a method and apparatus for depositing epitaxial layers, including successive layers, on a substrate by the solution growth technique.

Epitaxial layers of crystalline semiconductive material have been deposited on a crystalline substrate by flooding a surface of the substrate with a solution of a semiconductive material dissolved in a molten metallic solvent; cooling the solution so that a portion of the dissolved semiconductive material precipitates and deposits on the substrate as an epitaxial layer; then decanting the remainder of the solution. This method is known as solution growth, or liquid phase epitaxy. For a detailed description, see H. Nelson, "Epitaxial Growth From the Liquid State and Its Application to the Fabrication of Tunnel and Laser Diodes," RCA Review 24, p. 603, 1963. The solution may include a single given conductivity type modifier, so that the deposited epitaxial layer is of given conductivity type. Alternatively, the solution may contain two different conductivity type modifiers of mutually opposite types. The concentrations and solubilities of these two modifiers can be selected such that the first deposited portion of the epitaxial layer is of one conductivity type, while the subsequently deposited portion is of the opposite conductivity type. For details, see U.S. Pat. 3,158,512, issued Nov. 24, 1964 to H. Nelson et al.

The solution growth method has been utilized to deposit on a substrate some III–V compound semiconductors for example gallium arsenide, as epitaxial layers containing a PN junction, although the solution utilized contained only a single conductivity modifier. This is possible because certain conductivity modifiers, such as silicon and germanium, are amphoteric in these compounds semiconductors. These amphoteric modifiers are incorporated in different portions of the crystal lattice of the epitaxial semiconductive layer, depending on the temperature of deposition, and hence act as donors if incorporated in the epitaxial lattice at one temperature, and act as acceptors if incorporated in the lattice at a lower temperature. For details, see for example H. Kressel et al., "Luminescense in Silicon-Doped GaAs Grown by Liquid-Phase Epitaxy," Journal Applied Physics, Vol. 39, No. 4, pp. 2006–2011, March 1968.

For the fabrication of electroluminescent diodes, it is desirable to deposit successive epitaxial layers of mixed compound semiconductors, meaning materials having the formula $B_aAl_bGa_cIn_dN_eP_fAs_gSb_h$, wherein the subscripts $a$, $b$, $c$, $d$, $e$, $f$, $g$, and $h$ may vary from 0 to 1, and $a+b+c+d=1$, and $e+f+g+h=1$. However, the fabrication of successive epitaxial layers of these mixed semiconductive materials has hitherto been difficult, particularly when it is required that the successive layers be of mutually opposite conductivity types and of good crystal quality. However, there has been developed a method and apparatus for depositing successive epitaxial semiconductive layers on the surface of a substrate which has been found to be successful. This method includes bringing a surface of the substrate into contact with a first molten solution of a semiconductive material dissolved in a solvent and cooling the solution to deposit a first epitaxial layer of the semiconductive material on the substrate. The substrate is then brought into contact with a second molten solution of a semiconductive material dissolved in a solvent and the second solution is cooled to deposit a second epitaxial layer on the first epitaxial layer. An apparatus for carrying out this method comprises a refractory furnace boat having a plurality of spaced wells or bins therein and a movable slide extending through a recess in the boat which crosses the wells at the bottoms thereof. Each of the solutions is placed in a separate one of the wells and the substrate is placed in a slot in the slide. By moving the slide, the substrate is moved successively into each of the wells so as to place the substrate into contact with the solutions. Thus, the melting of and epitaxial growth from each solution takes place in a single separate well with the substrate being brought into contact with each molten solution by the slide. In addition, the movement of the slide scrapes the surface of each molten solution so as to provide the solution with a clean surface which is contacted by the substrate.

Although the method and apparatus described above has been successful in depositing epitaxial semiconductive layers on the surface of a substrate, problems have arisen when using this method and apparatus for depositing certain mixed compound semiconductors. I have discovered that when certain mixed compound semiconductors are heated in the wells in the refractory furnace boat to form the solution, a solid film is formed between the solution and the surfaces of the well and the slide. When the slide is moved to bring the substrate into contact with the solution, the material of the solid film is not removed by the movement of the slide and interferes with the deposition of the epitaxial layers from the solution causing poor adhesion of the epitaxial layer to the substrate and other disturbances, such as nodules, pits and poor crystalline features.

SUMMARY OF INVENTION

An epitaxial layer of crystalline semiconductive material is deposited on a substrate in a furnace boat having a growing well, a reservoir well and a substrate supporting slide which extends across the bottom of the growing well. The epitaxial layer is deposited by melting a charge containing a semiconductive material in the reservoir well. The molten charge is transferred from the reservoir well to the growing well and then a surface of the substrate is brought into contact with the molten charge in the growing well.

BRIEF DESCRIPTION OF DRAWING

The single figure of the drawing is a perspective view in section of an apparatus for carrying out the method of the present invention.

DETAILED DESCRIPTION

Referring to the drawing, the apparatus for carrying out the method of the present invention comprises a refractory furnace boat 10 of an inert material, such as graphite. The upper surface of the boat 10 is provided with a pair of wells or bins 12 and 14 separated by a common divider wall 16. The well 12 has a portion **12*a* spaced from the divider wall 16 which is deeper than the portion 12*b* which is adjacent the divider wall. Likewise, the well 14 has a portion 14*a* spaced from the divider wall 16 which is deeper than the portion 14*b* adjacent the divider wall. As will be explained, the deeper portions 12*a* and 14*a* of the wells 12 and 14 are growing wells and the shallower portions 12*b* and 14*b* are reservoir wells. As shown, the bottom surfaces 18 and 20 of the reservoir wells 12*b* and 14*b* are inclined downwardly from the growing wells 12*a* and 14*a* to the divider wall 16. However, the bottom surfaces 18 and 20** can be concave rather than inclined.

A movable slide 22, which is made of a refractory material, such as graphite, is disposed in a passage 24 which extends longitudinally through the boat 10 adjacent the bottom of the boat. The passage 24 extends across the bottoms of the growing wells **12*a* and 14*a* so that the top surface of the slide 22 is co-planar with the plane of the bottom of each of the growing wells. A recess 26 is provided in the top surface of the slide 22 adjacent one end of the slide. The recess 26 is adapted to receive a substrate 28 on which the epitaxial layer or layers are to be deposited. Preferably the recess 26 is of a size so that the substrate 28 completely fills the recess with the top surface of the substrate being parallel to and spaced slightly below the top surface of the slide 22**.

To epitaxially deposit a layer of semiconductor material on the substrate 28 in accordance with the method of the present invention using the apparatus 10, the substrate 28 is placed in the recess 26 in the slide 22 and the slide is moved to dispose the substrate adjacent to, but not in, a well, such as the well 12. Such a deposition of the substrate is shown in the drawing. A charge of the semiconductor material to be deposited on the substrate is placed in the reservoir well **12*b*. For depositing an epitaxial layer of a mixed compound semiconductive material the charge is a mixture of the ingredients of the semiconductive material and a metal solvent, which are generally granulated solids at room temperature. The loaded boat 10 is then placed in a furnace tube not shown. A flow of high purity hydrogen is provided through the furnace and over the boat 10** and the furnace and its contacts are heated to a temperature at which the charge melts and the semiconductive material dissolves in the solvent, which is generally about 950° C.

The heating means is then turned down and the furnace and its contacts are allowed to cool slowly, at, e.g., a rate of about 1° to 9° per minute. When the furnace temperature has dropped about 10 to 15 degrees, the boat 10 is tilted in the direction of arrow 30 to pour the melted solution from the reservoir well **12*b* into the growing well 12*a* and then is returned to its horizontal position. The slide 22 is then immediately pulled in the direction of arrow 32 so that the substrate 28 becomes the floor of the growing well 12*a* and is brought into contact with the solution in the growing well. As the furnace and its contents continue to cool, the semiconductive material in the solution precipitates and deposits on the substrate 28 as an epitaxial layer. When an epitaxial layer of the desired thickness is deposited on the substrate 28, the slide 22 is moved to a position where the substrate is out of the grawing well 12*a*, e.g., beneath the divider wall 16. When the furnace and its contents have cooled to a temperature at which the boat 10 can be handled, the boat is removed from the furnace and the substrate 28 with its epitaxial layer thereon removed from the slide 22**.

If it is desired to deposit two epitaxial layers on the substrate which are either of different semiconductive materials or of the same semiconductive materials having different conductivity type modifiers therein, a separate charge of the semiconductive materials to be deposited is placed in each of the reservoir wells **12*b* and 14*b*. The charge placed in the reservoir well 12*b* contains the semiconductive material to be deposited as the first layer on the substrate 28 and the charge placed in the reservoir well 14*b* contains the semiconductive material to be deposited as the second layer. The furnace boat 10 is placed in the furnace tube through which a flow of hydrogen is provided and the furnace is heated to the temperature at which the charges melt. This provides a solution of the semiconductive materials in each of the reservoir wells 12*b* and 14*b***.

The heating means is then turned down and the furnace and its contents are cooled at a slow rate. When the temperature of the furnace has dropped about 10 or 15 degrees, the boat 10 is tilted in the direction of arrow 30 to pour the solution from the reservoir well **12*b* into the growing well 12*a*, and then returned to its horizintal position. The slide 22 is immediately pulled in the direction of arrow 32 so that the substrate 28 becomes the floor of the growing well 12*a* and is in contact with the solution in the growing well 12*a*. As previously described, further cooling of the furnace and its contents causes the semiconductive material in the solution in the growing well 12*a* to precipitate and deposit on the substrate 28** to form a first epitaxial layer.

The boat 10 is then tilted in the direction of arrow 34 to pour the molten solution from the reservoir well **14*b* into the growing well 14*a* and the boat is returned to its horizontal position. The slide is then immediately pulled in the direction of the arrow 32 so that the substrate 28 now becomes the floor of the growing well 14*b*. During the move of the substrate 28 from the growing well 12*a* to the growing well 14*a*, the upper surface of the first epitaxial layer remains covered by a thin liquid film of the first solution from the growing well 12*a*. As the furnace and its contents continue to cool, the semiconductive material in the solution in the growing well 14*a* precipitates and deposits on the first epitaxial layer to form the second epitaxial layer. The slide 22 is then moved again in the direction of the arrow 32 to carry the substrate 26 out of the growing well 14*a*. When the furnace has cooled to a temperature at which the boat 10 can be handled, the boat is removed from the furnace and the substrate 28** with its epitaxial films thereon is removed from the slide.

In the method of the present invention, since the charges are melted in the reservoir wells **12*b* and 14*b***, any solid film formed between the melted charges and the surfaces of the boat are formed on the surfaces of the reservoir wells. When the boat is tilted to pour the melted solutions into the growing wells 12*a* and 14*a*, the material of the solid film is left in the reservoir wells 12*b* and 14*b* and clean solutions are provided in the growing wells 12*a* and 14*a*. In addition, as the slide 22 is moved to bring the substrate 28 into the respective growing wells 12*a* and 14*a*, the slide scrapes the surface of the solution in the respective growing well so as to further clean the surface of the solution. Therefore, when the substrate 28 is exposed to the solutions in the growing wells 12*a* and 14*a* there are no contaminates in the solutions which will interfere with proper deposition of the epitaxial layers on the substrate. Thus, this method provides epitaxial layers which have good adhesion to the substrate and are free of any disturbance.

The following is a specific example of the use of the present method for depositing two epitaxial layers of $Al_xGa_{1-x}As$, where $x$ is less than 1, semiconductive material on a substrate of GaAs where one of the layers is N type conductivity and the other layer of P type conductivity:

Example

A substrate of GaAs was placed in the recess 26 in the slide 22. A first charge consisting of 5.25 grams gallium, 0.7 gram gallium arsenide, 3 milligrams aluminum and 2.5 milligrams tellurium was placed in the reservoir well 12*b* of the boat 10. A second charge consisting of 6.25 grams gallium, 0.7 gram gallium arsenide, 7 milligrams aluminum and 200 milligrams zinc was placed in the reservoir well 14*b*. The ingredients of the charges were in granulated solid form at room temperature. The loaded furnace boat 10 was placed in a furnace tube and a flow of high purity hydrogen was passed through the furnace. The input power to the furnace heater was turned on to cause the temperature of the boat 10 to increase from 25° C. to 950° C. in about 20 minutes. When the furnace boat reached 950° C. the charges were melted forming a solution of gallium arsenide and aluminum dissolved in molten gallium. In addition, one of the solutions contained tellurium as a conductivity modifier which induces N type conductivity and the other solution contained zinc as a conductivity modifier which induces P type conductivity.

At 950° C. the input power to the furnace heater was reduced to cool the furnace boat and its contacts at a rate of 7° to 9° per minute. When the boat reached a temperature of 935° C. the boat was tilted in the direction of arrow 30 in the drawing by tilting the entire furnace tube. This caused the melted solution in the reservoir well 12*b* to pour into the growing well 12*a*. The boat was then returned to its horizontal position and the slide 22 was immediately pulled in the direction of arrow 32 to bring the GaAs substrate into contact with the solution in the growing well 12*a*. The substrate was maintained in this position until the temperature of the boat reached 885° C. During this time some of the gallium arsenide in the solution precipitated out and deposited on the substrate was a first epitaxial layer. Also, some of the aluminum and the tellurium in the solution precipitated out to become part of the epitaxial layer. The aluminum replaced some of the gallium atoms so that the layer was an alloy of gallium arsenide and aluminum arsenide, as a mixed semiconductor having the formula $Al_xGa_{1-x}As$, where $x$ is less than 1. The tellurium was incorporated in the crystal lattice of the epitaxial layer so as to provide an epitaxial layer of N type conductivity.

At 885° C. the furnace boat 10 was tilted in the direction of arrow 34 in the drawing by tilting the furnace tube. This poured the melted solution from the reservoir well 14*b* into the growing well 14*a*. The boat was then returned to its horizontal position and the slide 22 was immediately pulled in the direction of arrow 32 to bring the substrate within the growing well 14*a*. As the boat and its contacts continued to cool the gallium arsenide, aluminum and zinc in the solution in the growing well 14*a* precipitated and deposited on the first epitaxial layer. This formed a second epitaxial layer of $Al_xGa_{1-x}As$, where $x$ is less than 1, having zinc incorporated therein so as to provide a P type conductivity epitaxial layer. When the boat reached a temperature of 860° C. the power to the furnace heater was turned off and at 400° C. the boat was removed from the furnace.

It should be understood that the above example is by way of illustration only and that epitaxial layers of other known semiconductive materials such as silicon, gallium arsenide, gallium arsenide phosphide and other III–V compounds, may similarly be deposited by this method. Also, the conductivity types of the various layers may be reversed or the successive epitaxial layers may be of the same conductivity type but differing in resistivity.

I claim:

1. The method of depositing on a substrate an epitaxial layer of a crystalline semiconductive material in a furnace boat having a growing well, a reservoir well and a substrate supporting slide which extends across the bottom of the growing well comprising the steps of
   (a) melting a charge containing a semiconductive material in the reservoir well,
   (b) transferring the molten charge from the reservoir well to the growing well, and then
   (c) bringing one surface of the substrate into contact with the molten charge in the growing well.

2. The method of claim 1 in which the substrate is supported on the slide and is brought into contact with the molten charge in the growing well by moving the slide until the substrate is within the growing well.

3. The method in accordance with claim 2 in which the molten charge is transferred from the reservoir well to the growing well by tilting the furnace boat prior to moving the slide to bring the substrate into the growing well.

4. The method of claim 2 in which the charge is a mixture of a semiconductive material and a metallic solvent in which the semiconductive material will dissolve and the charge is heated to a temperature at which the ingredients of the charge melt and the semiconductor material dissolves in the solvent.

5. The method of claim 4 including cooling the molten charge while in contact with the substrate to deposit an epitaxial layer of the semiconductive material on the substrate.

6. The method of depositing on a substrate successive epitaxial layers of crystalline semiconductive material in a furnace boat having a pair of growing wells, a separate reservoir well adjacent each growing well and a substrate supporting slide which extends across the bottom of both growing wells comprising the steps of
   (a) placing separate charges containing a semiconductive material in each of the reservoir wells
   (b) heating the charges to a temperature at which the charges melt, then
   (c) transferring one of the molten charges from its reservoir well into its adjacent growing well, then
   (d) bringing one surface of the substrate into contact with said one molten charge in the growing well
   (e) depositing a first epitaxial layer of the semiconductive material in the one molten charge on the surface of the substrate, then
   (f) transferring the other molten charge from its reservoir well into its adjacent growing well, then
   (g) bringing said first epitaxial layer into contact with the other molten charge in its growing well, and
   (h) depositing a second epitaxial layer of the semiconductive material in the second molten charge on the first epitaxial layer.

7. The method of claim 6 in which the substrate is supported on the slide and is brought into contact with the molten charges in the growing wells by moving the slide until the substrate is within the respective growing well.

8. The method in accordance with claim 7 in which each of the molten charges is transferred from its respective reservoir well into its respective adjacent growing well by tilting the furnace boat prior to moving the slide to bring the substrate into the respective growing well.

9. The method of claim 7 in which each of the charges is a mixture of a semiconductive material and a metallic solvent in which the semiconductive material will dissolve and the charges are heated to a temperature at which the ingredients of the charges melt and the semiconductive material is dissolved in the solvent.

10. The method of claim 9 in which the epitaxial layers are deposited on the substrate by cooling the molten charges.

References Cited

UNITED STATES PATENTS

| | | | |
|---|---|---|---|
| 3,565,702 | 2/1971 | Nelson | 148—172 |
| 3,158,512 | 11/1964 | Nelson et al. | 148—1.5 |
| 3,551,219 | 12/1970 | Panish et al. | 148—171 |
| 3,463,680 | 8/1969 | Melngailis et al. | 148—172 |

GEORGE T. OZAKI, Primary Examiner

U.S. Cl. X.R.

148—171; 252—62.3 GA; 23—204 R, 301 R; 117—114, 201